May 24, 1927.
E. L. KASTLER
SLIDING BASE ENGINE
Filed April 17, 1925
1,629,918
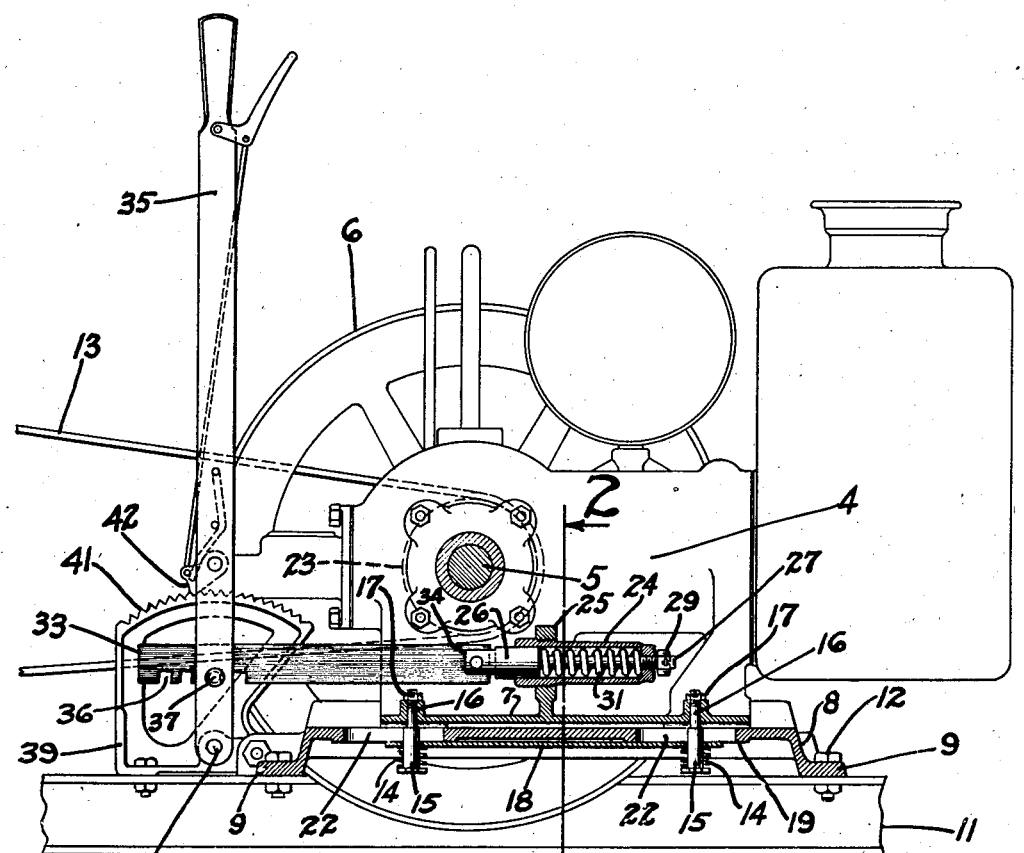
FIG.1
FIG.2
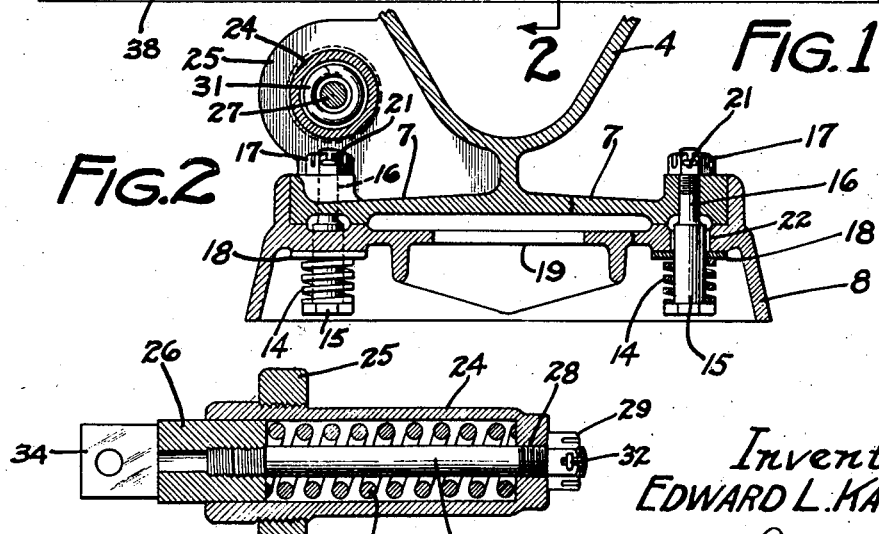
FIG.3
Inventor
EDWARD L. KASTLER
ATTORNEYS Patented May 24, 1927.

1,629,918

UNITED STATES PATENT OFFICE.

EDWARD L. KASTLER, OF FAIRMONT, MINNESOTA, ASSIGNOR TO FAIRMONT RAILWAY MOTORS, INC., OF FAIRMONT, MINNESOTA, A CORPORATION OF MINNESOTA.

SLIDING-BASE ENGINE.

Application filed April 17, 1925. Serial No. 23,991.

This invention relates to improvements in sliding base engines, and more particularly to an improved means for adjusting the tension of the belts of sliding base engines such as are commonly used in connection with railway motor cars, and which device also functions to automatically take up any wear or play between the engine and the sliding base upon which it is mounted.

An object of the invention is to provide a yieldable means for limiting the tension of a belt to prevent an overload being placed on the belt and also to provide means for taking up slack caused by the elongation of the belt as a result of stretching when in use.

A further object is to provide means adapted to absorb the horizontal vibration of a slidably mounted engine and to prevent such vibration being transmitted to the shifting lever or to the usual frame upon which the engine is mounted, such means also functioning to provide a uniform frictional contact between the engine and its supporting base.

A further object is to provide means for reducing the initial shock exerted on the belt when the shifting lever is suddenly actuated to tighten the belt.

The particular object of this invention, therefore, is to provide a simple and inexpensive means operable in conjunction with a sliding base engine to prevent the belt thereof from being subjected to an overload and also to automatically compensate for wear between the engine and the base upon which it is mounted.

Other objects of the invention will appear from the following description and the accompanying drawings and will be pointed out in the annexed claims.

In the accompanying drawings there has been disclosed a structure designed to carry out the various objects of the invention but it is to be understood that the invention is not confined to the exact features shown as various changes may be made within the scope of the claims which follow.

In the accompanying drawings forming a part of this specification,

Figure 1 is a view in side elevation of a conventional form of sliding base engine showing the invention applied thereto;

Figure 2 is an enlarged detail sectional view showing the yieldable means provided for taking up wear between the engine and the sliding base therefor;

Figure 3 is an enlarged detail sectional view showing the means provided for preventing an overload from being placed upon the belt when the shaft lever is actuated to tighten the belt.

In the selected embodiment of the invention here shown there is illustrated an internal combustion engine of the type commonly employed on railway motor cars for providing power therefor. This engine comprises the usual engine case 4, crank shaft 5 and flywheel 6. The engine or crankcase 4 is provided at its lower portion with a base 7 slidably mounted in a bed 8 having lugs 9 thereon whereby it may be conveniently secured to the frame 11 of the car by bolts 12.

A feature of this invention resides in the novel means provided for yieldably securing the engine to the bed 8, which connection is such as to allow the engine to be moved longitudinally upon the bed for the purpose of tightening the belt 13 through which power is transmitted from the engine to the driving mechanism or axle of the handcar or other driven means. In structures of this type, it is desirable that means be provided whereby the engine will be firmly held in its seat upon the bed 8 so that when the belt 13 is tightened by sliding the engine along its bed, the engine will not tilt or be moved out of contact with its seat in the sliding bed. It is also desirable that the connecting means between the engine and the bed be so constructed as to automatically take up any wear which may occur between the parts and at the same time provide a uniform friction between the engine and the bed which will tend to dampen or eliminate horizontal vibration.

The novel means featured in this invention for yieldably retaining the engine in its seat upon the bed 8, preferably consists of a coiled spring 14 mounted upon a shouldered stud 15 provided at each corner of the engine as shown in Figures 1 and 2. The upper reduced end-portion 16 of each stud is seated in an aperture provided in the engine frame and has a nut 17 received in threaded engagement therewith whereby each stud may be adjusted to increase or decrease the pressure of the springs 14 against the friction bar 18, interposed between the springs and the bottom of the upper wall 19 of the base. Cotterpins 21 are preferably provided in each stud to lock the nuts 17 in their adjusted positions upon the studs.

By reference to Figure 1, it will be noted that the studs 15 pass through elongated apertures or slots 22 provided in the top wall 19 of the bed 8. These slots are of such length as to permit the engine sufficient movement upon the bed to provide the necessary movement to tighten the belt when it is desired to transmit power to the driven mechanism. When the engine is moved in the opposite direction, the belt will be slackened sufficiently to permit the pulley 23 to slip in the belt thereby imparting no movement to the belt. The friction bar 18 at each side of the bed preferably extends from stud to stud as shown in Figure 1, so as to provide, substantially, a uniform frictional contact between the sliding engine base and the bed. The friction bar may be of any suitable material applicable for the purpose. By means of this novel construction, it will readily be seen that the base will at all times be yieldably retained in its seat upon the bed, the tension of the springs being sufficient to prevent the engine from being lifted off the bed when the belt is tightened. Also by this novel construction, the horizontal vibration of the engine will be substantially eliminated, thereby providing a very practical device for apparatus of this type.

Another feature of this invention resides in the novel means provided for sliding the engine upon its bed to tighten the belt for driving purposes. Such means preferably consists in mounting a tubular casing or barrel 24 in a lug 25 provided in the lower portion of the engine frame. As shown in Figure 3, the casing 24 is preferably received in a threaded socket in the lug 25 so that it may readily be removed therefrom when desired. A plunger 26 having a stud 27 secured thereto, is mounted to slide in the casing 24. The opposite end of the stud 27 outwardly projects through an aperture 28 provided in the end of the casing, and a nut 29 is adjustably mounted upon the end of the stud 27 so that the tension of the coiled spring 31, interposed between the plunger 26 and the end of the casing 24, may be relatively adjusted to increase or decrease the pressure exerted against the plunger 26. The nut 29 may be suitably locked in its adjusted positions upon the stud by means of a cotterpin 32.

A connecting bar 33 has one end pivotally connected to the forked end 34 of the plunger 26, and its opposite end adjustably connected to an operating lever 35 by means of a series of notches 36 adapted to receive a projecting pin 37 mounted in the lever 35 adjacent the lower pivotal connection 38 thereof. The lever 35 is preferably mounted in a bracket 39 which may be secured either to the bed 8 or to the frame 11 of the motor car so that when the lever is actuated, a sliding movement will be imparted to the engine mounted upon the bed. A suitable quadrant 41 and latch 42 are provided for locking the lever in its adjusted positions.

The novel belt tension adjustment above described functions to prevent an overload from being placed on the belt when the pulley 23 is moved into driving connection with the belt 13. Such prevention of an overload being placed on the belt is accomplished by the design of the spring 31 which is of such size as to provide only sufficient tension in the belt to prevent slippage between the belt and pulleys, when the engine is moved to the position shown in Figure 1. If desired, the spring may be so wound or designed that when it is compressed solid, that is with the coils abutting one another, the tension in the belt sections will not be sufficient to fracture the belt or cause an overload thereon. Thus, it will be seen that should the operating lever 35 suddenly be thrown from inoperative to operative position without any thought of the belt tension, no damage can be caused to the belt, as the spring 31 will function as a cushion and means for limiting the strain exerted against the belt. It will also function to eliminate or absorb vibration of the engine and to prevent such vibration from being transmitted to the shifting lever or frame upon which the engine is mounted. This novel device will also function to take up slack which may occur in the belt from stretching when operating under a heavy load. This feature is of particular advantage when a new belt is used to transmit power from the engine, as it is well-known that a new belt will often stretch to some extent when first put into use and, therefore, by means of this novel device, no care need be exercised in that respect as such stretching or slack in the belt will automatically be taken up by the action of the spring 31. The notches 36 in the connecting bar 33 function as a means for varying the effective length of the connecting bar 33 which adjustment is necessary only when mounting a new belt upon the pulley or in case that the belt stretches to a point where the lever will be in an inconvenient place for actuating it. Thus, it will be seen that regardless of the length of the belt, provided, of course, that it is within the limit of the sliding adjustment of the engine upon its bed, the position of the lever may be so adjusted as to be conveniently accessible regardless of the relative position of the engine upon its bed.

I claim as my invention:

1. A slidable engine base, a shaft journaled therein and having a pulley, a belt around the pulley, a barrel on said base, translatably adjustable by rotation and closed at one end, a plunger slidable in the barrel, a compression spring between the plunger and closed end, said plunger having a stem traversing the closed end passing through the spring and having a nut at the outer side in threaded engagement therewith, for varying the tension of the spring, a control lever pivoted independently of the bearing on the same side with the belt runs, a detent and rack for the lever, said lever having a pin, and a link pivoted to the plunger and having notches engageable over the pin of the lever, whereby tension upon the belt can be yieldably applied by movement of the base, and whereby the pivotal connection of link with the lever can be had to obtain maximum lever swing.

2. The combination with a frame and a motor provided with a pulley and a power transmission belt, of a bed whereon said motor base is movable to increase or decrease the tension of said belt, a shift lever on the bed, a spring on the motor frame having slidable means for varying its tension, and a link connecting lever and tension-varying means, for obtaining yielding tension on the belt and for preventing lever vibration.

3. The combination with a frame and a motor provided with a pulley and a power transmission belt, of a bed whereon the base of said motor is slidable, manually controlled means for shifting said motor on said bed, means for yieldingly clamping the base of said motor to said bed, a cushion spring, a shift lever, and connections therebetween for preventing vibration of the shift lever, to obtain and maintain tension adjustment of the belt by the lever, and to reduce initial shock on the belt when tension is suddenly increased by means of the lever.

4. The combination of a frame and a motor provided with a pulley and a power-transmission belt, of a bed having upstanding guide flanges for lateral engagement by the vertical sides of the motor base, means yieldably pressing the base against the bed, a shift lever upon the bed, a spring barrel on the base having a plunger and a spring compressibly adjustable thereby, and a link connecting plunger and lever, said link connected with the lever for step-by-step adjustment to vary an effective length of the link, following or conformable to belt stretching.

5. The combination of a bed and a motor provided with a pulley and a power transmission belt and a base slidable on said bed, a manually controlled mechanism yieldably connecting said bed with the motor base at one side of the motor for moving the motor to increase or decrease the tension on the belt, said means comprising a barrel on the motor frame, a spring in the barrel, a plunger for compressing the spring and having means for varying spring compression and forming a stop for positively moving the base to relieve belt tension, a shift lever on the bed having a projection, and a link connecting the plunger and having a series of notches successively engageable with the lever projection, for changing the effective length of the lever.

In witness whereof, I have hereunto set hand this 13th day of April, 1925.

EDWARD L. KASTLER.